(12) United States Patent
Bradford et al.

(10) Patent No.: US 8,832,302 B1
(45) Date of Patent: Sep. 9, 2014

(54) SYSTEM AND METHOD FOR A PRIORI SCHEDULING OF NETWORK SERVICES

(75) Inventors: Richard M. Bradford, Cedar Rapids, IA (US); Gary W. Daugherty, Cedar Rapids, IA (US); Kajari Ghoshdastidar, Iowa City, IA (US); Hai N. Le, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1698 days.

(21) Appl. No.: 11/394,404

(22) Filed: Mar. 31, 2006

(51) Int. Cl.
*G06F 15/16* (2006.01)
*G06F 15/173* (2006.01)
*H04W 4/00* (2009.01)

(52) U.S. Cl.
USPC ............................ 709/232; 709/238; 370/341

(58) Field of Classification Search
USPC ................................................. 709/238, 232
See application file for complete search history.

(56) References Cited

U.S. PATENT DOCUMENTS

| 7,693,122 | B2 * | 4/2010 | Carlson et al. | 370/341 |
| 2003/0078050 | A1 * | 4/2003 | Carlborg et al. | 455/452 |
| 2004/0203820 | A1 * | 10/2004 | Billhartz | 455/452.1 |
| 2005/0228892 | A1 * | 10/2005 | Riley et al. | 709/228 |
| 2006/0187858 | A1 * | 8/2006 | Kenichi et al. | 370/254 |
| 2007/0002821 | A1 * | 1/2007 | Carlson et al. | 370/349 |

* cited by examiner

*Primary Examiner* — Emmanuel L Moise
*Assistant Examiner* — Mahran Abu Roumi
(74) *Attorney, Agent, or Firm* — Donna P. Suchy; Daniel M. Barbieri

(57) ABSTRACT

The present invention is a method for providing services for a mobile ad hoc network, which includes receiving a service discovery request of a client node of the network. The method further includes directing the service discovery request to at least one node of the mobile ad hoc network. The method further includes receiving a service discovery request response from a node included in the at least one node, the response indicating that a service providing node is present within the network and is capable of providing the requested service. The method further includes determining a data transfer route for connecting the service providing node with the client node. The method further includes transmitting a service reservation request to the service providing node, wherein the service reservation request specifies a future time that a service is to be provided to the client node.

17 Claims, 4 Drawing Sheets

SYSTEM AND METHOD FOR A PRIORI SCHEDULING OF NETWORK SERVICES

FIELD OF THE INVENTION

The present invention relates to the field of computing systems and particularly to a system and method for a priori scheduling of network services.

BACKGROUND OF THE INVENTION

A mobile ad hoc network (MANET) is a network of nodes that gather spontaneously and communicate without requiring a pre-existing infrastructure, such as a base station. MANETs use a wireless communication medium and may be applied in various contexts. The characteristics of minimal configuration and quick deployment make MANETs suitable for implementation during emergency situations like natural or human-induced disasters, military conflicts and the like. A fundamental purpose for fielding MANETs is to allow individual members of a team, such as platoon of soldiers, to access and use services available from their peers. However, the dynamic topology of MANETs may make it difficult for nodes of the network to maintain an accurate, updated mapping of the network. Further, MANETs may be severely constrained in bandwidth and may include large numbers of users with very low-power devices. These factors (i.e., dynamic topology, constrained bandwidth, low-power devices) may make it difficult for a MANET to find requested services and to match clients to requested services in a reliable and timely manner. This difficulty is magnified when a large number of service requests from network users must be processed at or near the same time. During such times (i.e., peak traffic periods), overhead traffic generated while processing such requests may overwhelm the network and lead to delays in service provision or dropped communication. When these networks are implemented in possible life or death situations, such as during military conflicts, the network's inability to provide necessary services in a timely manner may have drastic consequences for team members (i.e., users of the network).

Therefore, it may be desirable to have a system and method for a priori scheduling of network services which addresses the above-referenced problems and limitations of the current solutions.

SUMMARY OF THE INVENTION

Accordingly, an embodiment of the present invention is directed to a method for providing services for a mobile ad hoc network, including: receiving a service discovery request of a client node of the network; directing the service discovery request to at least one node of the mobile ad hoc network; receiving a service discovery request response from a node included in the at least one node, the response indicating that a service providing node is present within the network and is capable of providing the requested service; determining a data transfer route for connecting the service providing node with the client node; and transmitting a service reservation request to the service providing node, wherein the service reservation request specifies a future time that a service is to be provided to the client node.

An additional embodiment of the present invention is directed to a system, including: a plurality of nodes configured as a mobile ad hoc network, the plurality of nodes including a client node and an intermediary node, the intermediary node being configured for directing a service reservation request of the client node to a service providing node included in the plurality of nodes, wherein the service reservation request specifies a future time that a service is to be provided to the client node.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
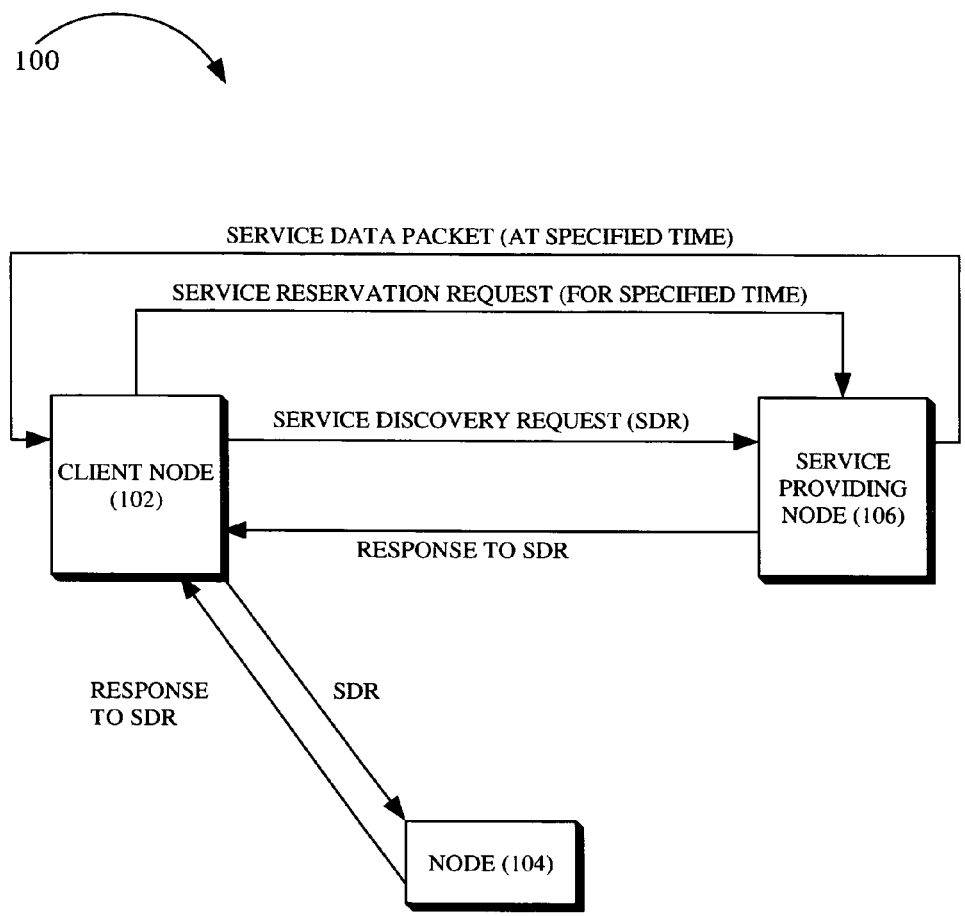
FIG. 1 is a block diagram illustrating a system for a priori scheduling of network services in accordance with an exemplary embodiment of the present invention.

Referring to FIG. 1, a system 100 for a priori scheduling of network services in accordance with an exemplary embodiment of the present invention is shown. In the exemplary embodiment, the system 100 includes a plurality of nodes (102, 104, 106) configured as a mobile ad hoc network. The mobile ad hoc network allows for each of the nodes to communicate via wireless links and to serve as routers for routing information between each node of the network. The mobile ad hoc network has a dynamic topology in which nodes may be mobile and may join/leave the network freely. Mobile ad hoc networks do not require a fixed or pre-existing infrastructure (i.e., a base station), providing an efficient networking solution in situations where a fixed infrastructure would likely be destroyed, such as during military conflicts, natural disasters and the like. Further, mobile ad hoc networks require minimal configuration, allowing them to be deployed quickly, which make them particularly useful in such situations.

In the exemplary embodiment, the nodes (102, 104 and 106) may be devices such as laptop computers, Personal Digital Assistants (PDAs), mobile phones, or the like for communicating and receiving/transferring services between them. For instance, each node may include a receiver and transmitter for allowing a plurality of geographically dispersed team members using the nodes to coordinate their activity by sending/receiving services to and from one another via wireless links of the network. For example, in a battlefield scenario, such services may include computing services such as GPS (Global Positioning System), tracking, Common Operational Picture, threat information or the like for assisting the team members utilizing their respective nodes trying to coordinate their activity.

In the exemplary embodiment, a user of a first node 102 (i.e., a client node) may need to have a service provided to the client node 102. For example, if the user is a member of a team of soldiers preparing to go into battle, he may want to have a service, such as Common Operation Picture, which displays the location of each member of the team in a real or near-real time manner, available for display on his node 102 just prior to or at the time of invasion. In this way, the user of the node 102 may be able to coordinate his activities with those of his fellow team members. Further, the client node 102 may have to obtain this service from one of the other nodes (104, 106) of the network. In the present embodiment, the client node 102 is configured for sending a service discovery request to the other nodes of the network (104 and 106). For instance, the client node may receive an input by a user which prompts the client node 102 to send a service discovery request to the other nodes (104, 106) of the network in order to determine if either of the other nodes (104, 106) can provide the service. If either of the nodes (104, 106) is able to provide the service (i.e., is a service providing node), the client node 102 may receive a response from one or both of the nodes (104, 106) indicating that one or both of the nodes (104, 106) can provide the service (i.e., act as a service providing node).

In the present embodiment, the client node 102 is configured for utilizing/processing the received response(s) to determine a data transfer route for connecting the client node 102 with a service providing node 106. For example, the system of the present invention may implement various routing protocols, preferably power-aware protocols, such as on-demand routing protocols (i.e., Ad Hoc On Demand Distance Vector (AODV), Temporally Ordered Routing Algorithm (TORA) and the like). FIG. 1 illustrates an embodiment in which the data transfer route connecting the client node 102 and the service providing node 106 is a single hop route (i.e., route that directly connects node 102 with node 106). In further embodiments, the data transfer route connecting the client node 102 and the service providing node 106 may be a multi-hop route (i.e., route which connects node 102 with node 106 via node 104. Because devices/nodes utilized in mobile ad hoc networks may often be low-power devices, multi-hop routing is a useful characteristic of mobile ad hoc networks. Because nodes in a mobile ad hoc network may move around freely, it is also possible that a pair of given nodes in the mobile ad hoc network may move out of range of one another, where they cannot communicate directly (via a single hop route) because of their low power. However, in such situations, a pair of given nodes in the network may still be able to communicate with one another via an intermediate node (via a multi-hop route), which is geographically positioned so that it is within range of both nodes.

Once a route is determined, the client node 102 is configured for directing a service reservation request to the service providing node 106. In the exemplary embodiment, the service reservation request specifies a future time that a service is to be provided to the client node 102. For example, a team member using the client node 102 may reserve a service ahead of time, such as Common Operational Picture, which may be required at or by a specific future time (ex.—just prior to or at the start of an invasion). Further, the user of the client node 102 may specify in the service reservation request the future time at or by which time the service should be provided.

In the present embodiment, the service providing node 106 is configured for providing the requested service utilizing the transfer of at least one data packet from the service providing node 106 to the client node 102 at the specified future time. Further, the client node 102 may be configured for receiving the at least data packet directly from the service providing node (via a single hop route). Alternatively, the client node 102 may be configured for receiving the at least one data packet from the service providing node via the intermediate node 104 (via a multi-hop route).

The ability of a service providing node to reserve services for a client node and to provide them to the client node at a future specified time allows the system 100 to schedule service discovery, routing and service request processing, thereby alleviating traffic burdens on the system. For example, the system 100 of the present invention allows for lead time to be provided between the time a service discovery request is sent and the time the service is actually needed such that the system 100 may be able to schedule the service discovery and service reservation request processing traffic in a manner which will not burden the system 100, thereby promoting timely provision of requested services. This ability becomes particularly important if the system 100 includes a large number of nodes requiring that a service be provided at the same specified future time.

Figure 2:
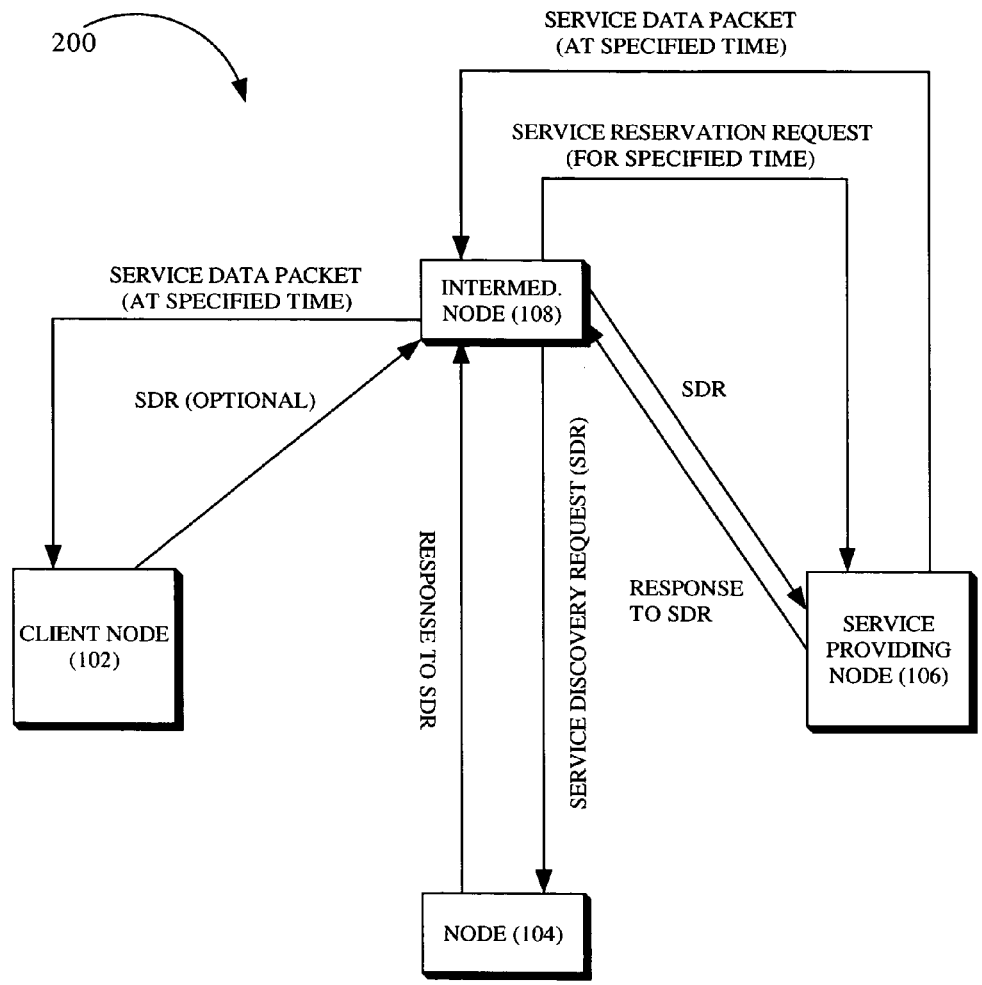
FIG. 2 is a block diagram illustrating a system for a priori scheduling of network services in accordance with an alternative embodiment of the present invention.
Figure 3:
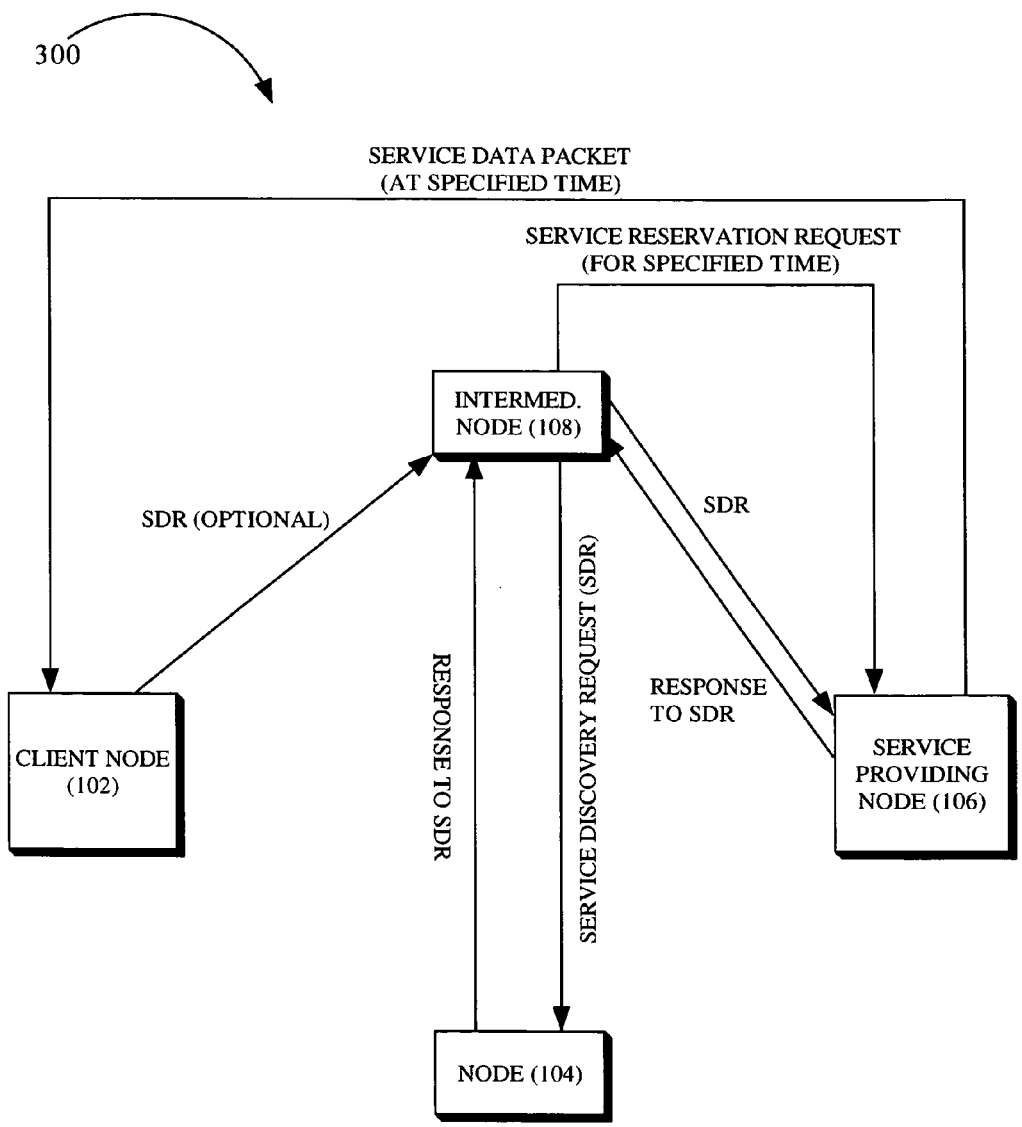
FIG. 3 is a block diagram illustrating a system for a priori scheduling of network services in accordance with a second alternative embodiment of the present invention; and, FIG. 4 is a flow chart illustrating a method for providing services for a mobile ad hoc network in accordance with an exemplary embodiment of the present invention.

Referring generally to FIGS. 2 and 3, systems (200, 300) for a priori scheduling of network services in accordance with exemplary embodiments of the present invention are shown. In the illustrated embodiments, each system (200, 300) includes a plurality of nodes (102, 104, 106, 108) configured as a mobile ad hoc network. In the exemplary embodiments, an intermediary node 108 is included and is configured for receiving a service discovery request of the client node 102. The intermediary node 108 may be a computing device located at a stationary site (ex.—a stationary node), such as at a military command post. Further, the intermediary node 108 may be configured with a higher-powered platform having greater connectivity than the mobile nodes (102, 104, 106) of the network. The intermediary node 108 may receive the service discovery request from the client node 102, via wireless link or, the service discovery request may be received via user input to the intermediary node 108, such as when a team member at the intermediary node already knows the service wanted by the service node 102.

In the exemplary embodiments shown in FIGS. 2 and 3, the intermediary node 108 is further configured for directing a service discovery request of the client node 102 to the other nodes (104, 106) of the network, not including the client node 102. If either of the nodes (104, 106) is able to provide the service (i.e., is a service providing node), the intermediary node 108 may receive a response from one or both of the nodes (104, 106). In the exemplary embodiments, the intermediary node 108 is configured for utilizing the received response(s) to determine a data transfer route for connecting the client node 102 with a service providing node 106. Once a route is determined, the intermediary node 108 is further configured for directing a service reservation request to the service providing node 106. In the exemplary embodiment, the service reservation request specifies a future time that a service is to be provided to the client node 102.

In the exemplary embodiments, as discussed above, the service providing node 106 is configured for providing the requested service, via transfer of at least one data packet, from the service providing node 106 to the client node 102 at the specified future time. In the embodiment illustrated in FIG. 2, the intermediary node 108 is configured for forwarding the at least one data packet from the service providing node 106 to the client node 102. This may be useful in situations in which the client node 102 is out of range of the service providing node 106. Further, as shown in FIG. 3, the client node 102 may be configured for receiving the at least one data packet directly from the service providing node 106.

The embodiments shown in FIGS. 2 and 3, which implement the intermediary node 108, allow for service discovery/routing/service request traffic to be handled by the high-power intermediary node 108, rather than the relatively lower-power client node 102. Such systems (200, 300) conserve the power of the relatively thin, lower-power mobile nodes (102, 104, 106) for other functions, which may allow the mobile nodes to stay connected to the network for a longer period of time. It is understood that the intermediary node 108, which, as previously discussed, may be located at a military command center, may be utilized to make a batch or collection of service reservation requests on behalf of each node (102, 104, 106) included in the group of lower-power mobile nodes.

Figure 4:
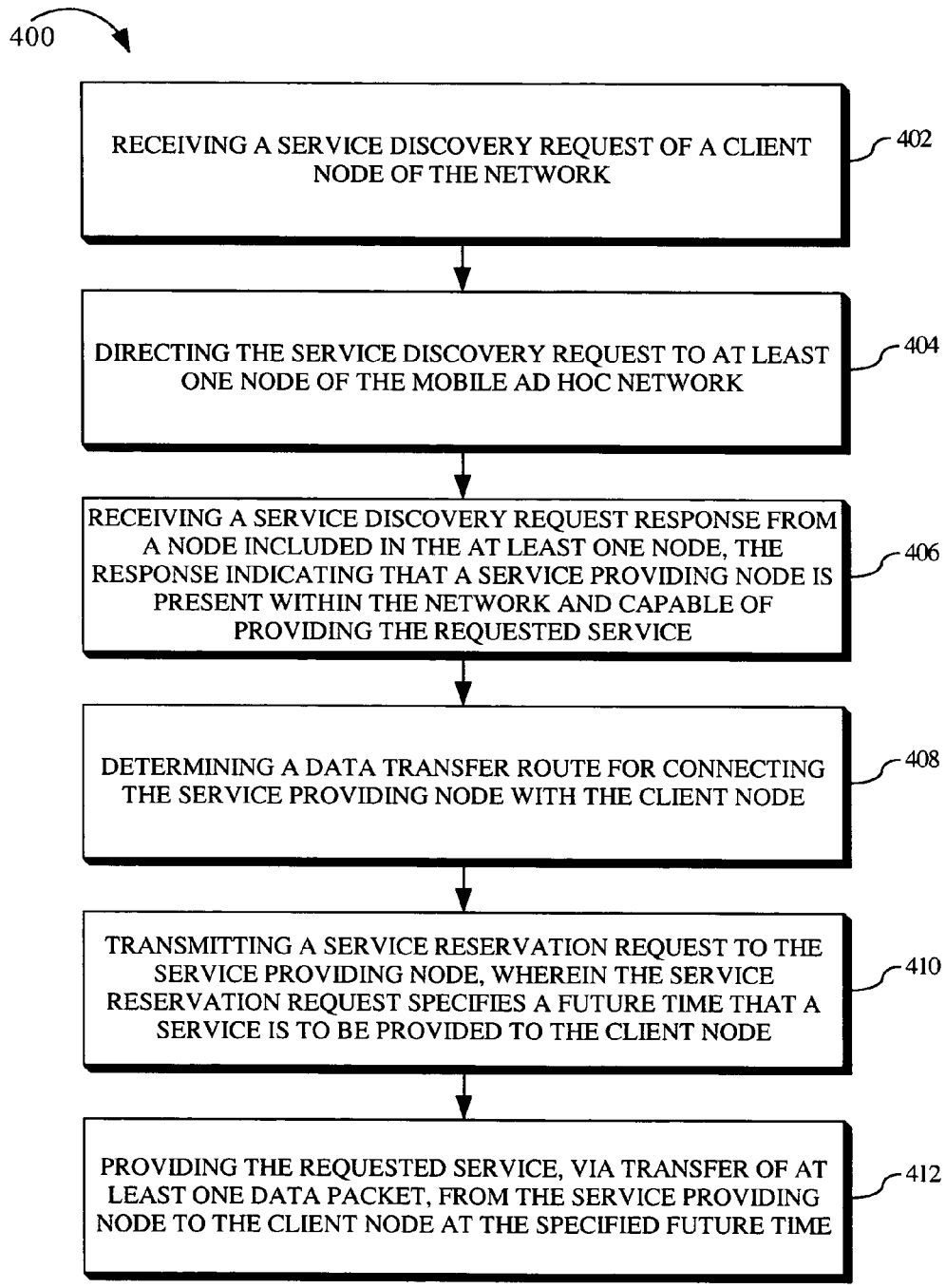

FIG. 4 illustrates a method 400 for providing services for a mobile ad hoc network in accordance with an exemplary embodiment of the present invention. In an exemplary embodiment, the method 400 includes receiving a service discovery request of a client node of the network 402. Preferably, the service discovery request is received at an off-peak (lower traffic) period for promoting timely service provision. The method 400 further includes directing the service discovery request to at least one node of the mobile ad hoc network 404. The method 400 further includes receiving a service discovery request response from a node included in the at least one node, the response indicating that a service providing node is present within the network and is capable of providing the requested service 406. The method 400 further includes determining a data transfer route for connecting the service providing node with the client node 408. The method 400 further includes transmitting a service reservation request to the service providing node 410, wherein the service reservation request specifies a future time that a service is to be provided to the client node. The method 400 further includes providing the requested service, via transfer of at least one data packet, from the service providing node to the client node at the specified future time 412. In alternative embodiments, if the requested service cannot be provided at the specified time, the requested service may be provided to the client node, as a feasible alternative, at a different time.

In further embodiments, knowledge of mission contingencies, probabilities and consequences may be taken into account in order to pre-compute alternative reservation plans in advance. For a given mission, the probability of certain events occurring may be anticipated. For example, the given mission may be to establish a checkpoint in Iraq. An example of an anticipated event which may likely occur during such a mission would be to encounter suspicious vehicles. Further, services required to respond to such events may also be anticipated. For instance, upon the event occurring of encountering suspicious vehicles, it may be desirable to assess, track, intercept and/or engage such vehicles. To assess whether a suspicious vehicle is worth tracking, it may be desirable to access a service which can search past incident reports for the descriptions of vehicles. To track a suspicious vehicle, it may be desirable to access a service responsible for dispatching UAVs (Unmanned Aerial Vehicles) or providing live satellite imagery. To intercept/engage a suspicious vehicle it may be desirable to have access to a command and control center capable of redeploying units in the area. In the above example, depending on the probabilities that: 1) a suspicious vehicle may be encountered; 2) a decision will be made to track the vehicle; and/or 3) a decision will be made to intercept and engage the vehicle, it may be desirable to reserve any or all of the above-referenced services so that they are readily available if needed, even if they are ultimately never used. For instance, the services may be ranked based on the following criteria: 1) the likelihood of events occurring which will trigger the need for said services; and 2) the severity of the consequences of failing to respond quickly to certain events. Those services considered most important based on the above criteria may be reserved in advance. In situations where command authorization is required to use a particular service (so as to prevent over-subscription), prior approval may be obtained, eliminating potentially lengthy approval cycles.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing services for a mobile ad hoc network, comprising:

receiving a plurality of service discovery requests of a client node of the network;

directing the plurality of service discovery requests to at least one node of the mobile ad hoc network;

receiving service discovery request responses from a node included in the at least one node, the responses indicating that a service providing node is present within the network and is capable of providing the requested services;

determining a data transfer route for connecting the service providing node with the client node;

assigning a ranking to each of the requested services based on: known probabilities of one or more events occurring during a known future time period which would trigger a need for said service and a severity of consequences to a user of the client node of failing to respond in a timely manner to said one or more events, a ranking being assigned to a service included in the requested services which is determined as having at least one of: one or more events having a substantial probability of occurring during the known future time period which would trigger the need for said service; and a severity of consequences to the user of said client node of failing to respond to an event triggering the need for said service;

transmitting a service reservation request to the service providing node for the requested service having the highest ranking, wherein the service reservation request specifies the known future time period that the requested service having the highest ranking is to be provided to the client node;

computing at least one alternative reservation plan to provide the service at the future time; and delivering the requested service having the highest ranking, via transfer of data packets, from the service providing node to the client node at the specified future time.

2. A method for providing services for a mobile ad hoc network as claimed in claim 1, wherein the service discovery requests of the client node are received via inputs to the client node of the mobile ad hoc network.

3. A method for providing services for a mobile ad hoc network as claimed in claim 1, wherein the service discovery requests of the client are received via inputs to an intermediary node, the intermediary node being a node having greater connectivity than the client node.

4. A method for providing services for a mobile ad hoc network as claimed in claim 1, wherein determining a route includes processing the received service discovery request responses.

5. A method for providing services for a mobile ad hoc network as claimed in claim 1, wherein the service discovery requests are received at off-peak times for the network.

6. A method for providing services for a mobile ad hoc network as claimed in claim 3, wherein the data packets are transferred from the service providing node to the client node via the intermediary node.

7. A method for providing services for a mobile ad hoc network as claimed in claim 1, further comprising:
determining that the requested service having the highest ranking requires a command authorization; and
obtaining a prior command authorization for the requested service having the highest ranking.

8. A non-transitory computer-readable medium having computer-executable instructions for performing a method for providing services for a mobile ad hoc network, said method comprising:
receiving a plurality of service discovery requests of a client node of the network;
directing the plurality of service discovery requests to at least one node of the mobile ad hoc network;
receiving service discovery request responses from a node included in the at least one node, the responses indicating that a service providing node is present within the network and is capable of providing the requested services;
determining a data transfer route for connecting the service providing node with the client node;
assigning a ranking to each of the requested services based on: known probabilities of one or more events occurring during a known future time period which would trigger a need for said service and a severity of consequences to a user of the client node of failing to respond to said one or more events, a ranking being assigned to a service included in the requested services which is determined as having at least one of: one or more events having a substantial probability of occurring during the known future time period which would trigger the need for said service; and a severity of consequences to the user of said client node of failing to respond in to an event triggering the need for said service;

transmitting a service reservation request to the service providing node for the requested service having the highest ranking, wherein the service reservation request specifies the known future time period that the requested services having the highest ranking is to be provided to the client node;

computing at least one alternative reservation plan to provide the service at the future time; and delivering the requested service having the highest ranking, via transfer of data packets, from the service providing node to the client node at the specified future time.

9. A computer-readable medium having computer-executable instructions for performing a method for providing services for a mobile ad hoc network as claimed in claim 8, wherein the service discovery requests of the client node are received via inputs to the client node of the mobile ad hoc network.

10. A computer-readable medium having computer-executable instructions for performing a method for providing services for a mobile ad hoc network as claimed in claim 8, wherein the service discovery requests of the client are received via inputs to an intermediary node, the intermediary node being a node having greater connectivity than the client node.

11. A computer-readable medium having computer-executable instructions for performing a method for providing services for a mobile ad hoc network as claimed in claim 8, wherein determining a route includes processing the received service discovery request response.

12. A computer-readable medium having computer-executable instructions for performing a method for providing services for a mobile ad hoc network as claimed in claim 8, wherein the service discovery requests are received at off-peak times for the network.

13. A computer-readable medium having computer-executable instructions for performing a method for providing services for a mobile ad hoc network as claimed in claim 10, wherein the data packets are transferred from the service providing node to the client node via the intermediary node.

14. A computer-readable medium having computer-executable instructions for performing a method for providing services for a mobile ad hoc network as claimed in claim 8, wherein the method further comprises:
determining that the requested service having the highest ranking requires a command authorization; and
obtaining a prior command authorization for the requested service having the highest ranking.

15. A system, comprising:
a plurality of nodes configured as a mobile ad hoc network, the plurality of nodes including a client node and an intermediary node, the intermediary node being configured for directing a plurality of service discovery requests of the client node over the network, the intermediary node being further configured for receiving service discovery request responses from a service providing node included in the plurality of nodes, the intermediary node being further configured for determining a data transfer route for connecting the service providing node with the client node, the intermediary node being further configured for assigning a ranking to each of the requested services based on: known probabilities of one or more events occurring during a known future time period which would trigger a need for said service and a severity of consequences to a user of the client node of failing to respond to said one or more events, a ranking being assigned to a service included in the requested services which is determined as having at least one of: one or more events having a substantial probability of occurring during the known future time period which would trigger the need for said service; and a severity of consequences to the user of said client node of failing to respond to an event triggering the need for said service, the intermediary node being further configured for transmitting a service reservation request to the service providing node for the requested service having the highest ranking, wherein the service reservation request specifies the known future time period that the requested service having the highest ranking is to be provided to the client node, the intermediary node being further configured to compute at least one alternative reservation plan to provide the service at the future time, wherein the service providing node is configured for delivering the requested service having the highest ranking, via transfer of data packets, from the service providing node to the client node at the specified future time.

16. A system as claimed in claim 15, wherein the client node is further configured for receiving the data packets directly from the service providing node.

17. A system as claimed in claim 15, wherein the network is configured so that the client node receives the data packets from the service providing node via the intermediary node.

* * * * *